United States Patent [19]

Arbjerg et al.

[11] Patent Number: 4,967,885
[45] Date of Patent: Nov. 6, 1990

[54] CLUTCH AND BRAKE APPARATUS OPERABLE BY A COMPRESSIBLE FLUID, PARTICULARLY PNEUMATICALLY

[75] Inventors: Niels Arbjerg, Sonderborg; Jesper Kirkegaard, Nordborg, both of Denmark

[73] Assignee: Danfoss A/S, Nordborg, Denmark

[21] Appl. No.: 411,881

[22] Filed: Sep. 25, 1989

[30] Foreign Application Priority Data

Oct. 7, 1988 [DE] Fed. Rep. of Germany ....... 3834138

[51] Int. Cl.⁵ .............................................. F16D 67/04
[52] U.S. Cl. ................................. 192/18 A; 192/12 C
[58] Field of Search ................. 192/18 A, 12 C, 106.1

[56] References Cited

U.S. PATENT DOCUMENTS

| | | | |
|---|---|---|---|
| 3,166,167 | 1/1965 | Kinsman | 192/18 A |
| 3,788,099 | 1/1974 | Miller | 192/106.1 |
| 4,418,807 | 12/1983 | Raines | 192/18 A |
| 4,630,718 | 12/1986 | Hanks | 192/18 A |
| 4,750,595 | 6/1988 | Dayen et al. | 192/18 A |

*Primary Examiner*—Rodney H. Bonck
*Assistant Examiner*—Andrea Pitts
*Attorney, Agent, or Firm*—Wayne B. Easton; Clayton R. Johnson

[57] ABSTRACT

Clutch and brake apparatus that is operable by a compressible fluid, particularly pneumatically, includes input and output shafts mounted in a common housing that has a clutch chamber. A clutch plate and a clutch flange are mounted in the clutch chamber with the flange being fixed to the input shaft and the clutch plate dividing the clutch chamber into two operating chambers that are adapted to be at different fluid pressures. A friction lining is fixed to at least one of the clutch plate and clutch flange for engaging the other. A clutch plate is mounted to be axially displacable relative to the output shaft in every load condition while at least one torque plate is fixed to rotate with the output shaft and a peripheral portion of the clutch plate. The torque plate is subjected to the same fluid pressure on both sides. The apparatus is able to operated with a large pressure differences across the clutch plate without danger of damaging the clutch plate.

10 Claims, 2 Drawing Sheets

CLUTCH AND BRAKE APPARATUS OPERABLE BY A COMPRESSIBLE FLUID, PARTICULARLY PNEUMATICALLY

The invention relates to clutch and brake apparatus operable by a compressible fluid, particularly pneumatically, comprising input and output shafts mounted in a common housing and terminating in a clutch chamber in the housing, wherein a clutch flange fixed to rotate with the input shaft and a clutch plate are disposed in the clutch chamber, and the clutch plate subdivides the clutch chamber into two operating chambers adapted to be at different pressures and can be applied to the clutch flange with an interposed friction lining or to an end face of the clutch chamber.

Such a clutch and brake apparatus is known from U.S. Pat. No. 3,166,167 (FIG. 3). In this apparatus, a pressure difference is built up across the clutch plate which, depending on the direction, presses the friction lining of the clutch plate either against the friction face of the clutch flange to accelerate the output shaft to the rotary speed of the input shaft or against the friction face at the end of the clutch chamber in order to brake the output shaft. The clutch plate has to transmit the frictional force necessary for coupling as well as the torque. In order that the clutch plate may be brought to bear on the two friction faces, it must be bendable, i.e. relatively thin or have an area of weakness or a stepped profile as shown, for example, in DE-PS No. 31 27 262. The thinner the clutch plate, the easier can the coupling force be applied because the resetting force of the clutch plate is lower but the transmissible torque is less.

If, now, a large torque has to be transmitted, the clutch plate has to be made correspondingly thicker. This requires a corresponding increase in pressure in order to bring the clutch plate into abutment with the friction faces against its increased inherent resilience. However, the increase in the differential pressure across the plate not only causes a higher pressure against the friction faces but also causes the plate to be subjected to higher stresses which can lead to damage of the plate.

From U.S. Pat. No. 3,166,167 (FIG. 1) it is also known to displace the clutch plate axially on a splined shaft when a corresponding differential pressure is built up. The torque is transmitted through the sides of the axially extending splines on the output shaft which engage in complementary grooves of the clutch plate. If the clutch plate is to be displaced under load, i.e. during intensive acceleration or braking, the frictional forces between the sides of the splines and the groove walls could become so high that displacement of the clutch plate is impeded and efficient functioning of the clutch and brake apparatus is no longer possible.

DE-PS No. 843 929 discloses an electro magnetically actuated friction clutch with a low moment of inertia of the driven clutch half, wherein the clutch plate is axially displaced on a splined shaft against the force of springs under the action of a magnet. This apparatus has the previously described disadvantages that, when switching under load, the proper function of the clutch will be ensured only if the actuating forces are very high.

It is the problem of the present invention to provide a clutch and brake apparatus which can operate with a high pressure difference across the clutch plate without the danger of damaging the clutch plate.

This problem is solved in a clutch and brake apparatus of the aforementioned kind in that the clutch plate is slightly axially displaceable relatively to the output shaft in every load condition, that there is at least one axially non-rotatable torque plate fixed to rotate with the output shaft and the circumference of the clutch plate, and that the torque plate is subjected to the same pressure on both sides.

"Input shaft" is to mean any means by which an input torque can be transmitted to the clutch flange. It can, for example, also be a pulley connected to the clutch flange.

If one disregards the connection of the clutch plate to the output shaft by the torque plate, the clutch plate is displaceable on the output shaft not only axially but also circumferentially. Accordingly, one cannot have the situation where the axial motion of the clutch plate is impeded because the friction between the output shaft and clutch plate is too high. In none of the operating conditions does a frictional or positive connection therefore exist between the clutch plate and output shaft in the region of the bearings. By means of the construction according to the invention, the torque transmission is disconnected from the transmission of the coupling force. The force necessary in order that the friction linings come to abut against the friction faces of the clutch flange or the end of the clutch chamber is applied in the axial direction across the clutch plate. The clutch plate itself need not transmit torque to the output shaft. Instead, the torque is transmitted by the torque plate which is secured to the periphery of the clutch plate. Periphery is here not only understood to mean the outer edge, i.e. the cylindrical outer wall of the clutch plate. Instead, the torque plate could also be secured to the clutch plate in a zone adjacent to this outer edge, for example within an annulus on the surface having an inner radius of about 70% of the clutch plate radius and an outer radius corresponding to that of the clutch plate. The torque plate has to remain sufficiently flexible to follow the movement of the clutch plate.

The clutch plate as well as the torque plate can be dimensioned solely for the task to be fulfilled by them without having regard to other influencing factors. The clutch plate can therefore be thicker than hitherto because it need no longer be bent. It can therefore withstand a higher pressure, whereby the friction force between the clutch plate and friction face is increased to transmit a higher torque. The torque plate can likewise be thicker if a higher torque is to be transmitted. Deformation of the torque plate will then require higher forces but this is no problem because the clutch plate can withstand a higher pressure difference between the two operating chambers without being subjected to excessively high stresses.

Since the clutch plate is mounted on the output shaft practically without friction, i.e. only under the normal friction, practically in all operating conditions, i.e. during idling as well as under load, one can no longer encounter the situation where the clutch plate is no longer movable because of excessive friction between it and the output shaft. The clutch plate retains this ability independently of the forces acting on it.

The pressure difference between the two operating chambers of the clutch chamber acting on the clutch plate can be readily taken up by the clutch plate because it is under the load of an additional force, namely the resetting force of the torque plate, in only one region, namely the circumferential region. This creates fewer stresses in the clutch plate so that the danger of damage is avoided. The torque plate itself is not subjected to any pressure difference. The stresses arising in it are caused solely from the two points of engagement of the connection to the output shaft and the connection to the clutch plate. However, these stresses are manageable.

In a preferred embodiment, the torque plate has apertures. In this way, one readily ensures that the same pressure obtains on both sides of the torque plate, i.e. no pressure difference is built up across the torque plate.

Advantageously, a single torque plate is provided which is mounted on the side of the clutch plate remote from the clutch flange. Basically, it is also possible to provide a torque plate on both sides of the clutch plate. In most cases, however, a single torque plate is sufficient in order to be sure to transmit the torque applied by the input shaft. An embodiment with a single torque plate is economical.

Preferably, the torque plate is clamped between a screw arrangement and the end of the output shaft. In this way, the torque plate can be secured to the output shaft in a simple manner. There is easy accessibility during assembly. Clamping also has the advantage that protection from an excessively large torque can be provided in the nature of a slip clutch because the torque plate can in that case slip against the clamping force.

Advantageously, the screw arrangement comprises a screw with a cylindrical head and the clutch plate has a central bore with an internal diameter coresponding to the diameter of the screw head, the clutch plate being mounted on the cylindrical surface of the screw head. This makes multiple use of the screw. First, it serves to clamp the torque plate and second to mount the clutch plate. One thereby obtains uniform centering of these two plates with respect to each other.

Advantageously, the height of the screw head is larger than the thickness of the clutch plate. In this way, axial guiding of the clutch plate is ensured over its entire range of movement.

In a preferred embodiment, the screw has a longitudinal bore and is screwed into a blind hole at the end of the output shaft from the end zone of which on the base side at least one passage extends to the shaft circumference and opens into an annular chamber which surrounds the output shaft and can be subjected to pressure. This construction provides a simple manner of passing air through the clutch plate, with the aid of which different pressures can be produced in the two operating chambers on both sides of the clutch plate. In every angular position of the output shaft, a fluid can be pressed through the annular chamber into the blind hole, whence the pressure is transmitted through the longitudinal throughhole into the operating chamber on the side of the input shaft.

Advantageously, a circumferential recess for receiving an O-ring is provided in the cylindrical bore of the clutch plate. The two operating chambers of the clutch chamber are thereby sealed in the region of the output shaft.

It is favourable for the passages of the input and output shafts through the housing to be sealed by lip seals. This ensures that the fluid under pressure cannot flow along the shafts and out of the housing.

In a further embodiment, the two operating chambers are sealed from each other by labyrinth seals at the circumference of the clutch plate. The pressure difference built up in the two operating chambers by the different pressures can therefore also not be eliminated past the outer periphery of the clutch plate.

A preferred example of the invention will now be described with reference to the drawing, wherein.

Figure 1:
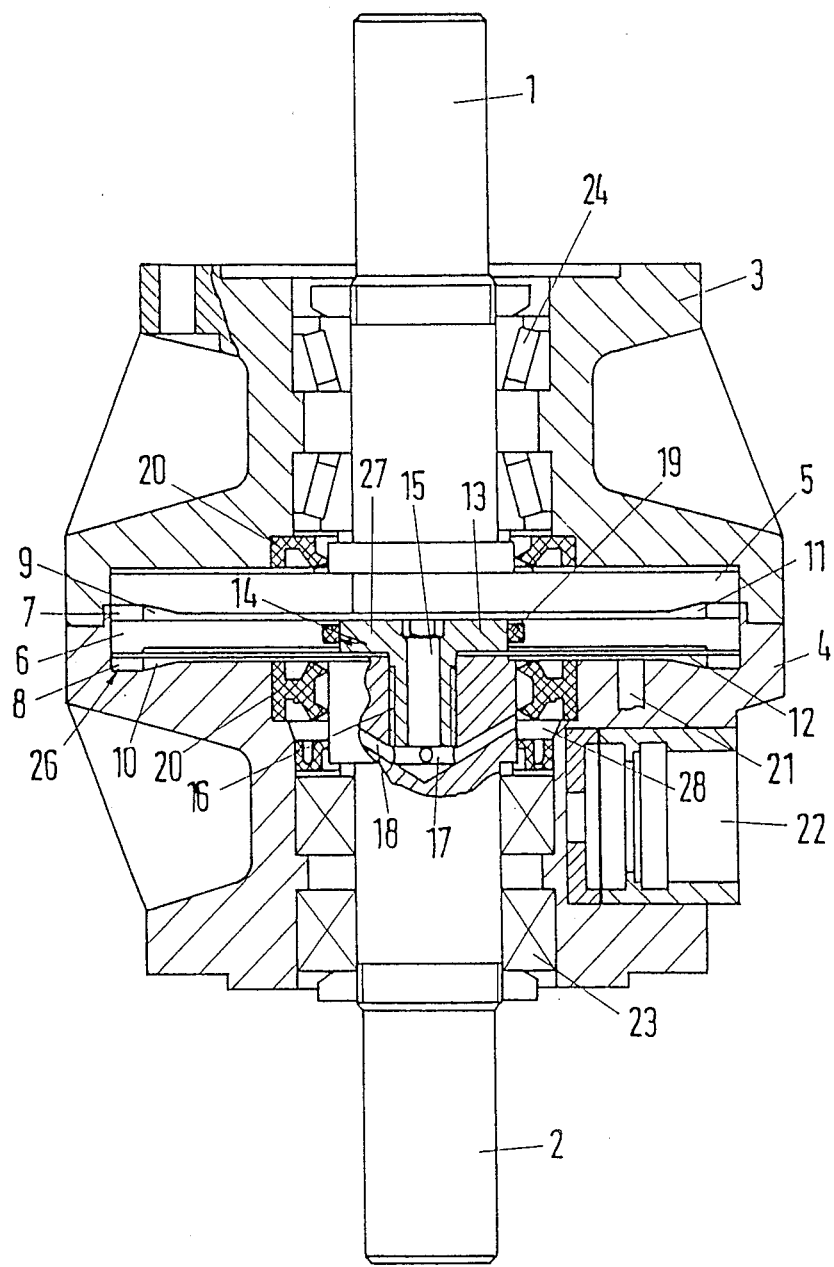
FIG. 1 is a sectional view of the clutch and brake apparatus.

The clutch and brake apparatus comprises an input shaft 1 and an output shaft 2 mounted in a common housing. The housing comprises a first half 3 and a second half 4 which are interconnected and enclose a clutch chamber 11. The input shaft 1 is mounted in bearings 24 in the first housing half 3 and terminates in the clutch chamber 11, it being enlarged to form a clutch flange 5. The output shaft 2 is likewise rotatably mounted in bearings 23 in the second housing half 4.

A clutch plate 6 arranged in the clutch chamber 11 subdivides the clutch chamber 11 into two operating chambers 9, 10 which can be subjected to different pressures. The clutch plate 6 comprises two friction linings 7, 8 with which it can be applied to the clutch flange 5 or to the end 26 of the clutch chamber 11 on the side of the output shaft. The output shaft 2 has a screwthread 16 in a blind hole 17 at its end. A screw 13 screwed into the screwthread has cylindrical head 27 on which the clutch plate 6 is rotatable and axially displaceable by means of a central bore 14. A torque plate 12 is clamped between the screw 13 and the output shaft 2 and connected to the clutch plate 5. The connection is on the side of the clutch plate 5 facing the torque plate 12, namely substantially in an annulus extending inwardly from the edge of the clutch plate 5.

Figure 3:
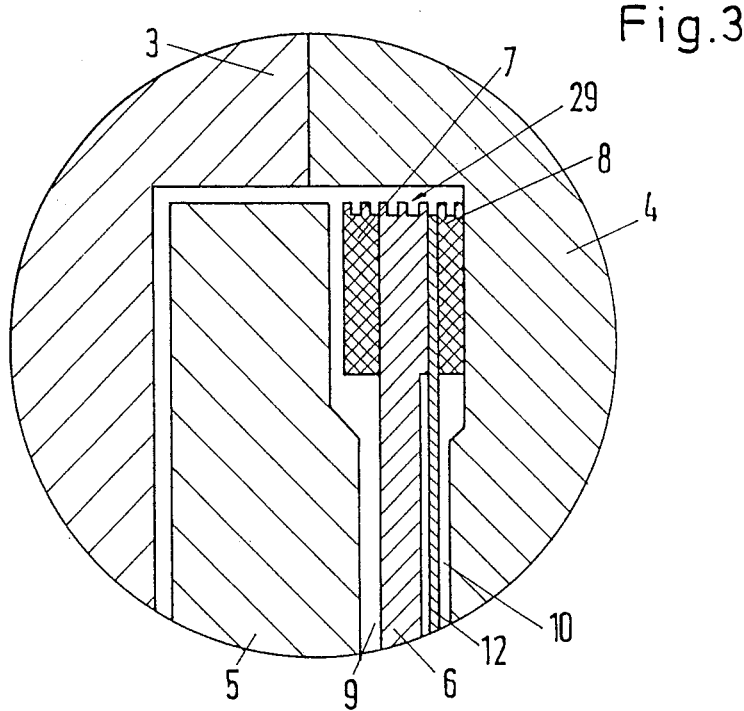
FIG. 3 is a detail of FIG. 1.

The screw 13 comprises a throughhole 15. From the end region of the blind hole 17, passages 18 extend to the circumference of the output shaft 2 and open in an annular chamber 28. The annular chamber communicates with a magnetic valve 22 by a passage (not shown). Depending on the position of the magnetic valve 22, the pressure of a fluid can reach the one operating chamber 9 by way of the annular chamber 28, the passages 18, the blind hole 17 and the bore 15. By way of a second magnetic valve (not shown), a fluid pressure can be built up in a second passage 21 which influences the pressure in the second operating chamber 10. In order that the pressures in the two operating chambers 9, 10 will remain separated, a circumferential groove in which an O-ring 19 is inserted is provided in the bore 14 of the clutch plate 6. At the outer circumference of the clutch plate 6, pressure equalisation is prevented by a labyrinth seal 29 (FIG. 3). The clutch chamber is sealed from the outside by lip seals 20.

Figure 2:
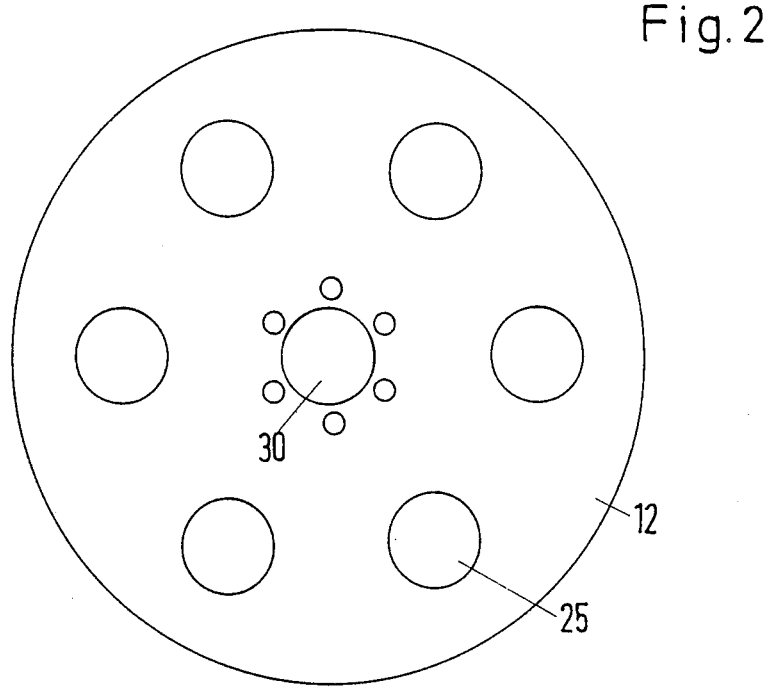
FIG. 2 is a plan view of the torque plate.

FIG. 2 is a plan view of the torque plate 12. At the centre there is a bore 30 through which the shank of the screw 13 is passed in order to secure the torque plate 12 to the output shaft 2. Further, there are bores 25 through which the pressure obtaining in the second operating chamber 10 can be distributed uniformly to both sides of the torque plate 12.

In operation, the input shaft 1 turns constantly. The clutch flange 5 turns with it. If, now, a pressure is built up in the second operating chamber 10 through the passage 21, the clutch plate 6 is displaced axially towards the input shaft 1. The friction lining 7 thereby comes into frictional contact with the frictional face of the clutch flange 5. The clutch plate starts to turn and takes the torque plate 12 with it because it is fixed to it in the direction of rotation. The torque plate 12 in turn accelerates the output shaft 2.

To brake the output shaft 2, the pressure in the second pressure chamber 10 is reduced. The valve 22 opens and allows a pressure to reach the first operating chamber 9 through the annular chamber 28, the passages 18, the blind hole 17 and the longitudinal bore 15 in the screw 13. The pressure build up in the first operating chamber 9 displaces the clutch plate 6 axially towards the output shaft 2. The friction lining 7 becomes released from the friction face of the clutch flange 5. Instead, the friction lining 8 makes frictional contact with the friction face of the end 26 of the clutch chamber 11. This brakes the clutch plate 6. The braking torque is transmitted by way of the torque plate 12 to the output shaft 2 which is thereby likewise braked. The pressure in the second operating chamber 10 is distributed uniformly to both sides of the torque plate 12 through the bores 25. The torque plate is thereby subjected to practically no stresses caused by the pressure.

Accordingly, the limiting factor for the pressure difference between the two operating chambers 9, 10 is merely the clutch plate 6. This can, however, be constructed so solidly that there is practically no limit to any particular pressure level. Thus, high frictional forces can be produced across the clutch plate so that higher torques can also be transmitted with the illustrated clutch and brake apparatus.

In FIG. 2, the torque plate is shown as being circular. This is not, however, the only possible construction. Instead, a multi-pointed star is possible which is secured to the clutch plate 6 at its tips whereas its centre is connected to the output shaft 2. Basically, any shape is conceivable for the torque plate 12 that permits a torque to be transmitted from the circumferential region of the clutch plate 6 to the output shaft 2 without the clutch plate 6 becoming jammed on the output shaft 2.

We claim:

1. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, a clutch plate disposed adjacent to the output shaft adjacent end in slightly axially movable relationship to the output shaft in every load condition and to at least in part subdivide the clutch chamber into two operating chambers that are adapted to be at different fluid pressures, at least one of the clutch plate and clutch flange mounting a friction lining engagable with the other, the clutch plate having an inner peripheral wall of a larger diameter than the diameter of the output shaft and axially opposite first and second sides, at least one of the clutch plate sides having a radial outer circumferential portion axially opposite the clutch flange, a torque plate axially opposite the clutch plate from the clutch flange and having axially opposite sides and an aperture opening therethrough so that the torque plate sides are subjected to the same fluid pressure, the torque plate being fixed rotatable to the circumferential portion to rotate therewith, and first means for forming a fluid seal with the clutch plate inner peripheral wall while permitting the clutch plate moving axially relative thereto and to the output shaft and retaining the torque plate in fixed angular relationship to the output shaft, at least one of the shafts, the first means and the housing having second means for changing the fluid pressure in the chambers to change the axial position of the clutch plate in the chambers.

2. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, a clutch plate disposed adjacent to the output shaft adjacent end in slightly axially movable relationship to the output shaft in every load condition and to at least in part subdivide the clutch chamber into two operating chambers that are adapted to be at different fluid pressures, at least one of the clutch plate and clutch flange mounting a friction lining engagable with the other, the clutch plate having axially opposite first and second sides, at least one of the clutch plate sides having a circumferential portion opposite the clutch flange, a torque plate having axially opposite sides that are subjected to the same fluid pressure, the torque plate being fixed rotatable to the circumferential portion to rotate therewith, and first means for retaining the torque plate in fixed angular relationship to the output shaft, at least one of the shafts, the first means and the housing having second means for applying different pressure to the chambers, the first means comprising a screw arrangement threadedly mounted by the output shaft adjacent end for clamping the torque plate to the output shaft, the screw arrangement comprising a screw having a cylindrical head, the cylindrical head having a circumferential surface of a given diameter and the clutch plate having a central bore of a larger diameter than the diameter of the screw head cylindrical surface, the clutch plate being radially aligned with the cylindrical surface of the screw head.

3. Apparatus according to claim 2, characterized in that the height of the screw head is larger than the axial thickness of the clutch plate.

4. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, a clutch plate disposed adjacent to the output shaft adjacent end in slightly axially movable relationship to the output shaft in every load condition and to at least in part subdivide the clutch chamber into two operating chambers that are adapted to be at different fluid pressures, at least one of the clutch plate and clutch flange mounting a friction lining engagable with the other, the clutch plate having axially opposite first and second sides, at least one of the clutch plate sides having a circumferential portion opposite the clutch flange, a torque plate having axially opposite sides that are subjected to the same fluid pressure, the torque plate being fixed rotatable to the circumferential portion to rotate therewith, and first means for retaining the torque plate in fixed angular relationship to the output shaft, at least one of the shafts, the first means and the housing having second means for applying different pressure to the chambers, the first means comprising a screw arrangement threadedly mounted by the output shaft adjacent end for clamping the torque plate to the output shaft, the adjacent end of the output shaft having an axially extending threaded blind hole, and the screw arrangement comprising a screw having an axially extending bore and being threaded into the blind hole, the housing having an annular chamber surrounding the output shaft that is adapted to be subjected to fluid pressure and the output shaft having a circumferential surface and at least one passage that opens through the output shaft circumferential surface to the annular chamber and to the screw bore, the screw bore, annular chamber and passage forming at least a part of the second means.

5. Apparatus according to claim 4, characterized in that the screw has a cylindrical screw head, that the clutch plate has wall means defining a cylindrical central bore in surrounding relationship to the screw head and that an O-ring is provided between the clutch plate wall means and the cylindrical head.

6. A clutch and brake apparatus operable by compressible fluid, comprising a housing having wall means that at least in part define a clutch chamber and includes axially opposite first and second end walls and a circumferential wall extending between the first and second end walls, an output shaft, an input shaft, means mounted by the housing for mounting the shafts for rotation about coextensive rotary axes, the input and output shafts having adjacent first ends, a clutch flange mounted to the input shaft adjacent end to rotate therewith, a clutch plate disposed in the clutch chamber and adjacent to the output shaft adjacent end in slightly axially movable relationship to the output shaft in every load condition and to at least in part subdivide the clutch chamber into two operating chambers that are adapted to be at different pressures, the clutch plate having a radial inner circumferential bore wall radially spaced from the output shaft to provide an annular clearance space between the output shaft and the clutch plate and a radial outer portion providing a labyrinth seal with the wall means circumferential wall, at least one of the clutch plate and clutch flange mounting a friction lining engagable with the other, the clutch plate having axially opposite first and second sides, at least one of the clutch plate sides having a circumferential portion opposite the clutch flange radially outwardly of the clutch plate bore, a torque plate having axially opposite sides that are subjected to the same fluid pressure, a radial outer portion fixed rotatable to the clutch plate circumferential portion to rotate therewith, and first means for retaining the torque plate in fixed angular relationship to the output shaft, at least one of the shafts, first means and the housing having second means for applying different pressure to the operating chambers.

7. Apparatus according to claim 6, characterized in that the clutch plate and torque plate having radial intermediate portions axially spaced from one another to provide an annular clearance space.

8. Apparatus according to claim 7, characterized in that the torque plate is axially between the clutch plate and the first end wall, that the clutch flange is axially between the clutch plate and the second end wall, and that the second means includes a first passage opens axially between the clutch plate and clutch flange and a second passage opens axially between the torques plate and clutch plate, and that an O-ring is provide radially between the output shaft and the bore wall to provide a fluid seal therewith.

9. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, a clutch plate disposed adjacent to the output shaft adjacent end in slightly axially movable relationship to the output shaft in every load condition and to at least in part subdivide the clutch chamber into two operating chambers that are adapted to be at different fluid pressures, at least one of the clutch plate and clutch flange mounting a friction lining engagable with the other, the clutch plate having axially opposite first and second sides, at least one of the clutch plate sides having a circumferential portion opposite the clutch flange, a torque plate having axially opposite sides that are subjected to the same fluid pressure, the torque plate being fixed rotatable to the circumferential portion to rotate therewith, and first means for retaining the torque plate in fixed angular relationship to the output shaft, at least one of the shafts, the first means and the housing having second means for applying different pressure to the chambers, the clutch plate having a radially outer edge that has labyrinth seals to seal the two chambers from one another.

10. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, a clutch plate disposed adjacent to the output shaft adjacent end in slightly axially movable relationship to the output shaft in every load condition and to at least in part subdivide the clutch chamber into two operating chambers that are adapted to be at different fluid pressures, at least one of the clutch plate and clutch flange mounting a friction lining engagable with the other, the clutch plate having axially opposite first and second sides, at least one of the clutch plate sides having a circumferential portion opposite the clutch flange, a torque plate having axially opposite sides that are subjected to the same fluid pressure, the torque plate being fixed rotatable to the circumferential portion to rotate therewith, first means for retaining the torque plate in fixed angular relationship to the output shaft, at least one of the shafts, the first means and the housing having second means for applying different pressure to the chambers, the housing having first and second bore wall portions defining first and second bores in which the input and output shafts are respectively extended and that lip seals are provided on the respective shaft to form a fluid seal with the radially adjacent portion.

* * * * *